United States Patent
Javidi et al.

(10) Patent No.: US 7,088,480 B1
(45) Date of Patent: Aug. 8, 2006

(54) DISTORTION-TOLERANT 3-D OBJECT RECOGNITION BY USING SINGLE EXPOSURE ON-AXIS DIGITAL HOLOGRAPHY

(75) Inventors: Bahram Javidi, Storrs, CT (US); Daesuk Kim, Suwon (KR)

(73) Assignee: The University of Connecticut, Farmington, CT (US)

( * ) Notice: Subject to any disclaimer, the term of this patent is extended or adjusted under 35 U.S.C. 154(b) by 0 days.

(21) Appl. No.: 11/261,044

(22) Filed: Oct. 28, 2005

(51) Int. Cl.
*G03H 1/08* (2006.01)

(52) U.S. Cl. .............................. 359/9; 359/10; 359/15; 359/35

(58) Field of Classification Search .................. 359/9, 359/15, 35, 10–11; 382/210
See application file for complete search history.

(56) References Cited

OTHER PUBLICATIONS

B.Javidi, "Three dimensional object recognition by use of digital holography", Optics Letters, 25(9), pp. 610-612(2000).*

E.Tajahuerce, et. al., "Shift-invariant three dimensional object recognition by means of digital holography", Applied Optics, 40(23), pp. 3877-3886(2001).*

Y.Frauel, et. al., "Distortion tolerant three dimensional object recognition with digital holography", Applied Optics, 40(23), pp. 3887-3893(2001).*

Daesuk Kim and Bahram Javidi, Distortion-tolerant 3-D object recognition by using single exposure on-axis digital holography, Optics Express, Nov. 1, 2004, vol. 12, No. 22.

* cited by examiner

*Primary Examiner*—Leonidas Boutsikaris
(74) *Attorney, Agent, or Firm*—Cantor Colburn LLP (57) ABSTRACT

Disclosed herein is a method, system and computer readable medium for a distortion-tolerant 3-D object recognition that may include recording a single exposure digital hologram of a 3D object on a sensor by on-axis digital holography; representing the recorded single exposure digital hologram mathematically as a synthesized hologram and as a reconstructed complex wave function of the 3D object; repeating the steps above for at least one comparison 3D object and obtaining a comparison reconstructed complex wave function of the comparison 3D object; and constructing a correlation filter for 3D distortion-tolerant object recognition from the reconstructed complex wave function of the 3D object and from the at least one comparison reconstructed complex wave function of the comparison 3D object also recorded; and correlating the reconstructed complex wave function of the 3D object to the comparison reconstructed complex wave function of the comparison 3D object using the correlation filter in order to recognize 3D objects.

20 Claims, 9 Drawing Sheets

DISTORTION-TOLERANT 3-D OBJECT RECOGNITION BY USING SINGLE EXPOSURE ON-AXIS DIGITAL HOLOGRAPHY

BACKGROUND

Optical systems have been extensively studied for object recognition. With rapid advances in CCD array sensors, computers and software, digital holography can be performed efficiently as an optical system for 3-D object recognition. Digital holography has also been a subject of great interest in various fields.

In digital holography, the off-axis scheme has been widely used since it is simple and requires only a single exposure in separating the desired real image term from the undesired DC and conjugate terms.

However, 3-D object recognition by use of the off-axis scheme has inherent limitations in terms of robustness to the variation of the 3-D object position due to the superposition of the real image with undesired terms.

The tolerance problem to the variation of the 3-D object positioning can be resolved by employing an on-axis scheme. For example, 3-D object recognition by use of phase shifting digital holography has provided a feasible approach for implementing on-axis 3-D object recognition.

The phase shifting digital holographic method requires multiple hologram recordings. Therefore, the 3-D object recognition system based on the on-axis phase shifting approach has inherent constraints in the sense that it needs a vibration-free environment that is convenient only in a laboratory. Also, it is sensitive to recording a moving object.

BRIEF DESCRIPTION OF THE INVENTION

An embodiment may comprise a method for a distortion-tolerant 3-D object recognition comprising: recording a single exposure digital hologram of a 3D object on a sensor by on-axis digital holography; representing the recorded single exposure digital hologram mathematically as a synthesized hologram comprising object and reference wave functions; numerically reconstructing 3D multi-perspective sectional images of the 3D object at different distances and different angles of view from the sensor from the synthesized hologram as a reconstructed complex wave function of the 3D object; repeating the steps above for at least one comparison 3D object and obtaining a comparison reconstructed complex wave function of the comparison 3D object; constructing a correlation filter for 3D distortion-tolerant object recognition from the reconstructed complex wave function of the 3D object and from the at least one comparison reconstructed complex wave function of the comparison 3D object also recorded; and correlating the reconstructed complex wave function of the 3D object to the comparison reconstructed complex wave function of the comparison 3D object using the correlation filter in order to recognize 3D objects.

An embodiment may also comprise a sensor system for a distortion-tolerant 3-D object recognition comprising: a sensor for recording a single exposure digital hologram of a 3D object by on-axis digital holography; a processor for representing the recorded single exposure digital hologram mathematically as a synthesized hologram comprising object and reference wave functions and numerically reconstructing 3D multi-perspective sectional images of the 3D object at different distances and different angles of view from the sensor from the synthesized hologram as a reconstructed complex wave function of the 3D object and for repeating the steps above for at least one comparison 3D object and obtaining a comparison reconstructed complex wave function of the comparison 3D object; and a correlation filter for 3D distortion-tolerant object recognition from the reconstructed complex wave function of the 3D object and from the at least one comparison reconstructed complex wave function of the comparison 3D object also recorded and correlating the reconstructed complex wave function of the 3D object to the comparison reconstructed complex wave function of the comparison 3D object using the correlation filter in order to recognize 3D objects.

An embodiment may also comprise a computer readable medium having computer readable instructions stored thereon for execution by a processor to perform a method for a distortion-tolerant 3-D object recognition comprising: recording a single exposure digital hologram of a 3D object on a sensor by on-axis digital holography; representing the recorded single exposure digital hologram mathematically as a synthesized hologram comprising object and reference wave functions; numerically reconstructing 3D multi-perspective sectional images of the 3D object at different distances and different angles of view from the sensor from the synthesized hologram as a reconstructed complex wave function of the 3D object; repeating the steps above for at least one comparison 3D object and obtaining a comparison reconstructed complex wave function of the comparison 3D object; constructing a correlation filter for 3D distortion-tolerant object recognition from the reconstructed complex wave function of the 3D object and from the at least one comparison reconstructed complex wave function of the comparison 3D object also recorded; and correlating the reconstructed complex wave function of the 3D object to the comparison reconstructed complex wave function of the comparison 3D object using the correlation filter in order to recognize 3D objects.

BRIEF DESCRIPTION OF THE FIGURES

Embodiments will now be described, by way of example only, with reference to the accompanying drawings which are meant to be exemplary, not limiting, and wherein like elements are numbered alike in several Figures, in which:

FIGS. 4. (a)–(f): are three reconstructed training images from the synthesized hologram #6 by use of (a)–(c) single exposure on-axis digital holography and (d)–(f) multiple exposures on-axis phase shift digital holography.

FIGS. 7. (a)–(d) show a normalized correlation when input image #8 of the non-training true targets and input image #13 among the false class objects are used as input scenes for (a)–(b) single exposure on-axis digital holography and (c)–(d) on-axis phase shift digital holography.

DETAILED DESCRIPTION

Therefore, it is proposed herein that such limitations of 3-D object recognition can be overcome by use of single exposure on-axis digital holography. The method described below provides a distortion-tolerant 3-D object recognition method based on single exposure on-axis digital holography.

It also shown herein that the single exposure on-axis based 3-D object recognition can provide a distortion-tolerant 3-D object recognition capability comparable with that which is obtainable by use of on-axis phase shifting digital holography, while maintaining practical advantages of the single exposure on-axis scheme, such as robustness to environmental disturbances and tolerance to moving targets.

Single Exposure on-Axis Digital Holography.

An exemplary embodiment is described below.

Figure 1:
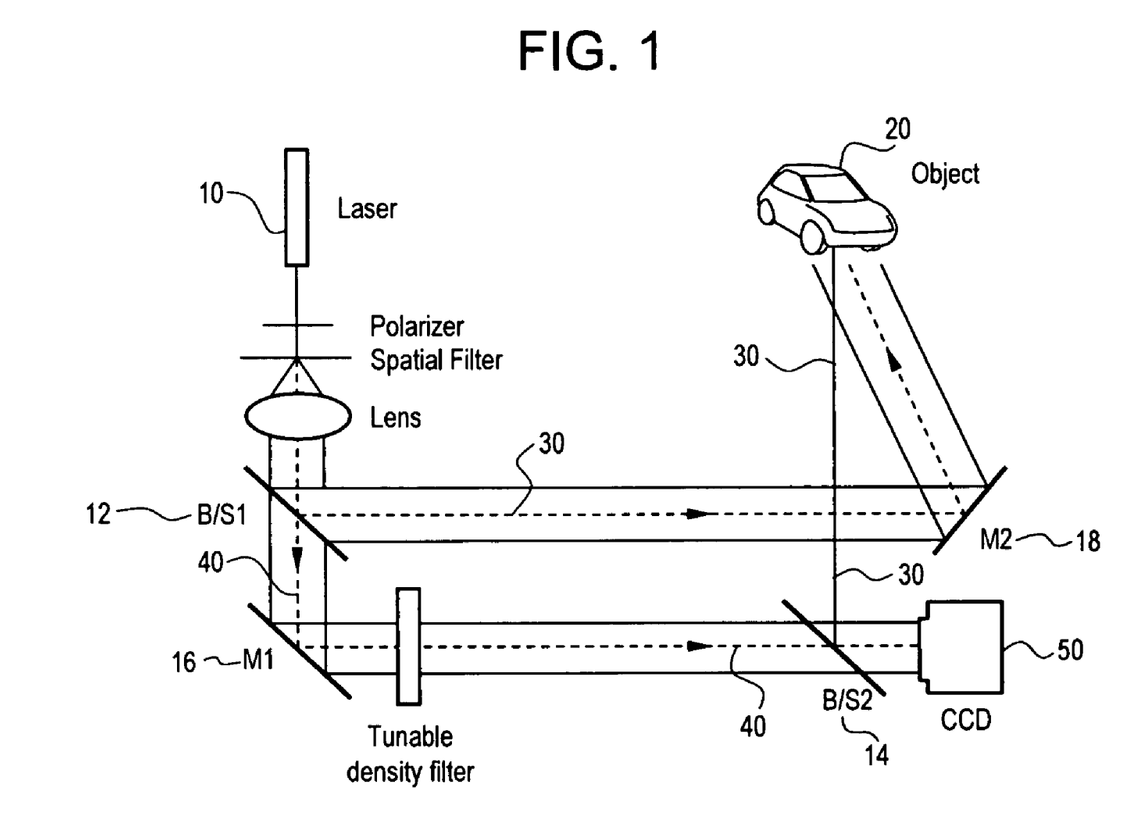
FIG. 1. is schematic diagram of an embodiment showing a setup of a distortion-tolerant 3-D object recognition system based on single exposure on-axis scheme.

The basic experimental setup for the single exposure on-axis digital holographic system is based on a Mach-Zehnder interferometer as shown in FIG. 1.

B/S 1 and B/S 2 are beam splitters 12, and 14 respectively. M1 and M2 represent plane mirrors 16, and 18. Polarized light from an Ar laser source 10 tuned to 514.5 nm is expanded and divided into object beam 30 and reference beam 40. The object beam 30 illuminates the object 20 and the reference beam 40 propagates on-axis with the light diffracted (30) from the object (This is different from an off-axis set up for example). In order to match the overall intensity level between the reference wave and the reflected wave from the 3-D object, a tunable density filter 34 is used in the reference beam 40 path. The interference between the object beam 30 and the reference beam 40 are recorded by a CCD camera 50. Significantly, in contrast to on-axis phase shifting digital holography, no phase shifting components are required.

The conventional on-axis "phase shifting" digital holography can be implemented by inserting a quarter wave plate in the reference beam path. For on-axis phase shifting digital holography, the hologram recorded on the CCD can be represented as follows.

$$H(x,y,\theta) = |O(x,y)|^2 + |R(x,y)|^2 + \exp(-i\theta)O(x,y)R^*(x,y) + \exp(i\theta)O^*(x,y)R(x,y) \quad (1)$$

Here, [O(x,y)] and [R(x,y)] represent the Fresnel diffraction of the 3-D object and the reference wave functions, respectively. θ is an induced phase shift. In on-axis phase shifting digital holography based on multiple holograms, the desired object wave function [O(x,y)] can be subtracted by use of two holograms having λ/4 phase difference and two DC terms $|O(x,y)|^2$ and $|R(x,y)|^2$ as follows:

$$u_i^M(x, y) = O(x, y)R^*(x, y) \quad (2)$$

$$= \frac{1}{2}\{[H(x, y, 0) - |O(x, y)|^2 - |R(x, y)|^2] +$$

$$i[H(x, y, \frac{\pi}{2}) - |O(x, y)|^2 - |R(x, y)|^2]\}$$

Here, $u_i^M(x,y)$ represents the synthesized hologram obtained by on-axis phase shifting digital holography which requires multiple recordings.

In contrast, the following novel expression represents the synthesized hologram obtained by use of single exposure on-axis digital holography:

$$u_i^S(x, y) = O(x, y)R^*(x, y) + O^*(x, y)R(x, y) \quad (3)$$

$$= H(x, y, 0) - |R(x, y)|^2 -$$

$$\frac{1}{N^2}\sum_{k=0}^{N-1}\sum_{l=0}^{N-1}\{H(k\Delta x, l\Delta y, 0) - |R(k\Delta x, l\Delta y)|^2\}$$

Figure 2:
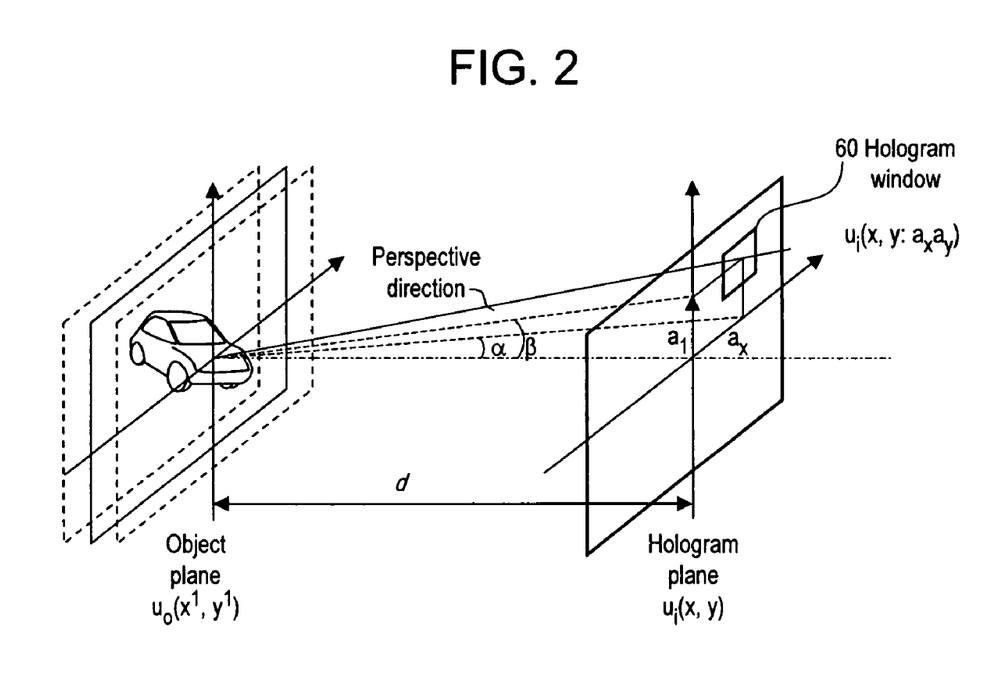
FIG. 2. is schematic diagram of a three-dimensional multiple image sectioning and multi perspectives by digital holography.

Here, N is the windowed hologram size used for image reconstruction. Δx and Δy represent the directional spatial resolution of the CCD, see FIG. 2. The reference wave can be assumed to be a known function because it is not changed while the object intensity distribution varies according to the input scene. The DC term $|O(x,y)|^2$ generated by the object can be reduced effectively by employing an averaging over the whole hologram as described in the third term of Eq.(3). Thus, the index $u_i^S(x,y)$ can be regarded as a synthesized result obtained by use of only a single hologram. However, the single exposure on-axis approach suffers from the superposition of the conjugate image which degrades the reconstructed image quality.

However, for 3-D object recognition, the inherent conjugate term in single exposure on-axis digital holography may not substantially degrade the recognition capability since the conjugate image term also contains information about the 3-D object.

Distortion Tolerant 3-D Object Recognition

In order to apply the distortion-tolerant 3-D object recognition, we first need to numerically reconstruct 3-D object images. 3-D multi perspective section images on any parallel plane can be reconstructed by using the following inverse Fresnel transformation:

$$u_o(x', y') = \frac{\exp(ikd)}{id\lambda}\exp\left[\frac{ik}{2d}(x'^2 + y'^2)\right] \times \quad (4)$$

$$F\left\{u_i(x, y)\exp\left[\frac{ik}{2d}(x^2 + y^2)\right]\right\}$$

Here, F denotes the 2-D Fourier transformation. $u_i(x,y)$ represents the synthesized hologram which can be either $u_i^M(x,y)$ in Eq. (2) or $u_i^S(x,y)$ in Eq. (3). $u_o(x',y')$ is the reconstructed complex optical field at a parallel plane which is at a distance d from the CCD (see d in FIG. 2). By changing d, we can reconstruct multiple section images from the single hologram without using any optical focusing. Different regions of the digital hologram can be used for reconstructing different perspectives of the 3-D object with the angle of view (α,β) as depicted in FIG. 2. $u_i(x,y; \alpha_x, \alpha_y)$ denotes the amplitude distribution in the window of the hologram used for the 3-D object reconstruction. Here, $\alpha_x$ and $\alpha_y$ are central pixel coordinates of the hologram window.

Distortion Tolerant Composite Filter Design

The reconstructed complex wave $u_o(x',y')$ in Eq. (4) can be directly used to construct a variety of correlation filters for 3-D object recognition. However, direct use of the reconstructed image for constructing a matched filter may prevent us from recognizing correctly distorted true class targets.

In order to improve the distortion-tolerant recognition capability, removing phase terms in the reconstructed complex field decreases high sensitivity. Also, we can employ some pre-processing such as averaging and median filtering to remove speckle.

A main goal of the proposed distortion-tolerant 3-D object recognition by use of single exposure on-axis digital holography is to recognize a distorted reference 3-D object as a true input while correctly rejecting false class objects. For this purpose, a filter must be designed to provide high performance distortion-tolerant 3-D object recognition capability.

We now describe the detailed process of creating the composite filter by use of single exposure on-axis digital holography We measure M different holograms as we change the perspectives on a 3-D reference object. After capturing each single hologram, we can make a synthesized hologram $u_i^S(x,y)$ which can be used for reconstructing the complex wave function $u_0(x',y')$. Then, in order to decrease high sensitivity of the reconstructed wave function, we remove phase terms in the reconstructed complex field and apply some pre-processing techniques of averaging and median filtering. By use of such pre-processed M training images represented by $s_1(x,y), s_2(x,y), \ldots s_M(x,y)$, we can generate p-dimensional column vectors $s_1, s_2, \ldots, s_M$ by taking the rows of the m×n matrix and linking their transpose to create a p=m×n vector. We compute the Fourier transformation of each training image and obtain a new set of column vectors $S_1, S_2, \ldots, S_M$. Then, we nonlinearly modify the amplitude of each column vector by use of the power law nonlinearity by which those column vectors become $S_1^k, S_2^k, \ldots, S_M^k$. This power-law operation is defined for any complex vector v as follows:

$$v^k = \begin{bmatrix} v[1]^k \exp(j\phi_v[1]) \\ v[2]^k \exp(j\phi_v[2]) \\ \vdots \\ v[p]^k \exp(j\phi_v[p]) \end{bmatrix} \quad (5)$$

Now, we define a new matrix $S^k=[S_1^k, S_2^k, \ldots, S_M^k]$ with vector $S_i$ as its ith column. Using such notation, the k-law based non-linear composite filter $h^k$ can be defined in the spatial domain as follows:

$$h^k = F^{-1}\{S^k[(S^k)^+S^k]^{-1}c^*\} \quad (6)$$

Here $(S^k)^{30}$ is the complex conjugate transpose of $S^k$. The vector c contains the desired cross-correlation output origin values for each Fourier transformed training data $S_i$ and the notation c* denotes the complex conjugate of c.

Experimental Results

We compare the distortion tolerant 3-D object recognition capability of the single exposure scheme with that of the multiple exposure on-axis phase shifting holographic approach. Experiments have been conducted with a 3-D object as the reference object which is 25×25×35 mm and several false 3-D objects with similar size. The reference car is located at a distance d=880 mm from the CCD camera. We use an argon laser of 514.5 nm. The CCD has a pixel size of 12×12 μm and 2048×2048 pixels. However, throughout the experiment, we use only 1024×10²⁴ pixels for each reconstruction process since multi perspectives are required from a single hologram in making a composite filter.

Rotation Tolerance

First, we acquire nine synthesized holograms of the reference true class object labeled from 1 to 9 (synthesized holograms: #1~#9 not shown) for on-axis phase shifting approach as well as single exposure on-axis scheme. For every synthesized hologram capturing step, the reference object is rotated by 0.2° around the axis orthogonal to FIG. 1.

Figure 3A:
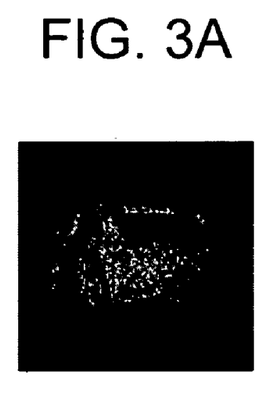
FIGS. 3a. and 3b. are reconstructed images of a reference true target prior to pre-processing by use of (a) single exposure on-axis digital holography and (b) multiple exposures on-axis phase shifting digital holography.
Figure 3B:
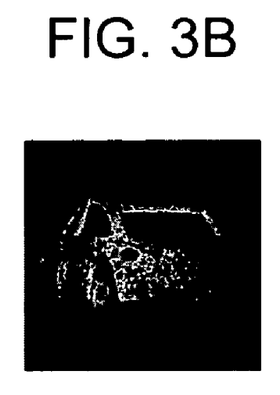

FIGS. 3(a) and (b) show the reconstructed image of the reference 3-D object from one of the synthesized holograms by use of single exposure on-axis digital holography (FIG. 3A) and on-axis phase shifting digital holography (FIG. 3B), respectively. They are reconstructed by using the central window area of 1024×1024 pixels from the total synthesized hologram of 2048×2048 pixels. As can be seen, even the reconstructed image with only amplitude data contains high frequency speckle patterns. In order to smooth the high frequency amplitude distribution, we need to employ pre-processing techniques. Specifically, we use the window of 6×6 pixels for averaging which is followed by a median filtering with the window size of 5×5 pixels. After the averaging process, 1024×1024 pixels is reduced to 171×171 pixels since we reconstruct a new image with averaged values calculated for each averaging window. After the median filtering process, the image size of 171×171 pixels remains unchanged.

Figure 4A:
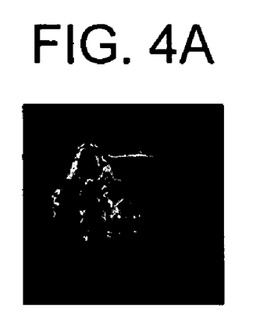
Figure 4B:
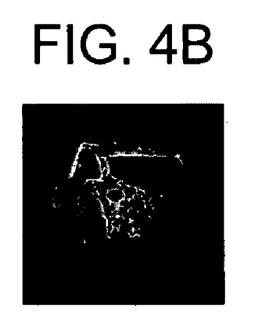
Figure 4C:
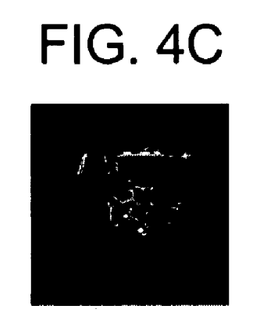

Among the nine synthesized holograms of the true class reference object, we use three (synthesized holograms: #3, #6 and #9 (not shown)) to construct a non-linear composite filter. For each of those three synthesized holograms, we select one centered window of 1024×1024 pixels and two different windows of the same size to reconstruct three training images with different perspectives from each synthesized hologram. FIG. 4(a)–(c) depict three pre-processed training images reconstructed from the synthesized hologram #6.

Figure 4D:
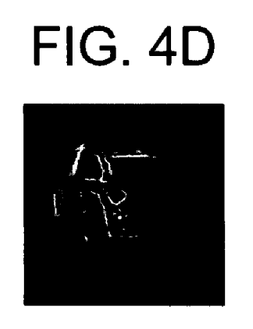
Figure 4E:
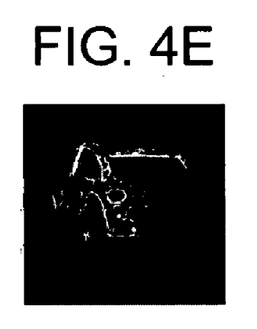
Figure 4F:
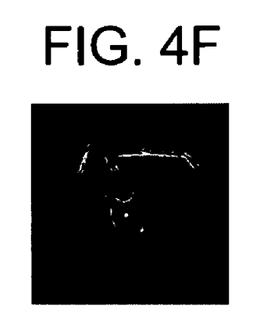
Figure 5A:
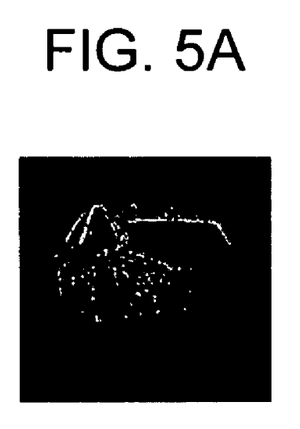
FIGS. 5(a)–5(b) show constructed non-linear composite filters for distortion-tolerant 3-D object recognition by use of (a) single exposure on-axis digital holography and (b) on-axis phase shift digital holography.
Figure 5B:
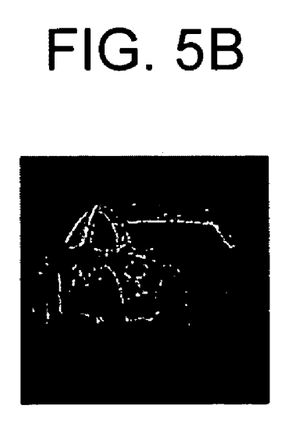
Figure 6A:
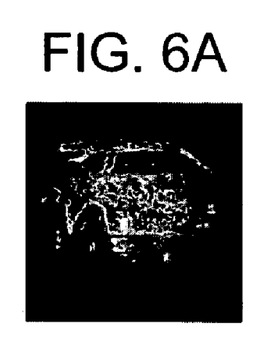
FIGS. 6a–6f. show reconstructed images of some false class objects (images: #10, #13 and #15) by use of (a)–(c) single exposure on-axis digital holography and (d)–(f) on-axis phase shift digital holography.
Figure 6B:
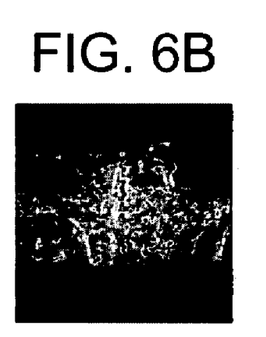
Figure 6C:
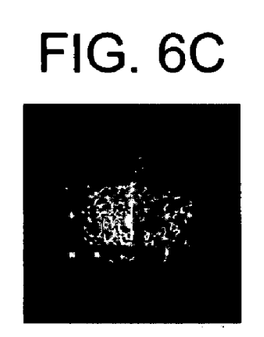
Figure 6D:
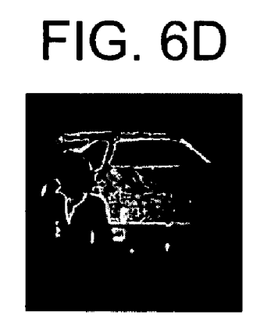
Figure 6E:
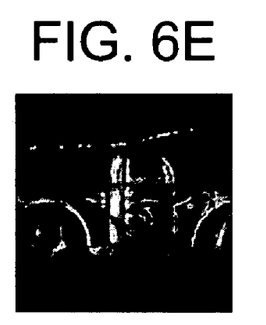
Figure 6F:
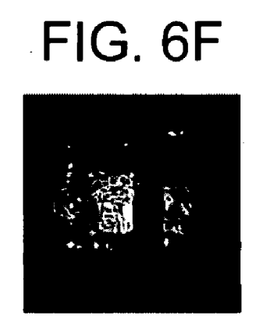

FIGS. 4(a) and (b) have a viewing angle difference of 0.4°. The viewing angle difference between FIGS. 4(a) and (c) is 0.8°. FIG. 4(d)–(f) represent the three views obtained by use of phase-shifting on-axis digital holography. In the same way, we can obtain nine training images from the three synthesized holograms (synthesized holograms: #3, #6 and #9). Then, we construct a non-linear composite filter by following the procedures described in Section 3. We use a non-linear factor k=0.1 in Eq. (6) to improve the discrimination capability of the nonlinear filter. FIGS. 5(a) and (b) depict the final non-linear composite filters that can be used for the single exposure approach and the multiple exposure approach, respectively.

Once we construct the composite filter, we perform the distortion-tolerant 3-D object recognition process for various input objects. We acquire more synthesized holograms for several false class objects labeled from 10 to 15 (synthesized hologram: #10~#15). Now, we have fifteen synthesized holograms consisting of true and false class objects. We can reconstruct fifteen images by using the central window area of 1024×1024 pixels from the total synthesized hologram of 2048×2048 pixels and perform the pre-processing.

Finally, those fifteen pre-processed images (input images: #1~#15) are put in the input scene for distortion-tolerant 3-D object recognition. FIG. 6 shows some of the false class objects (images: #10, #13 and #15). Six input images (images: #1, #2, #4, #5, #7 and #8) among the nine true class inputs (images: #1#9) are used as our non-training distorted true class objects.

Figure 7A:
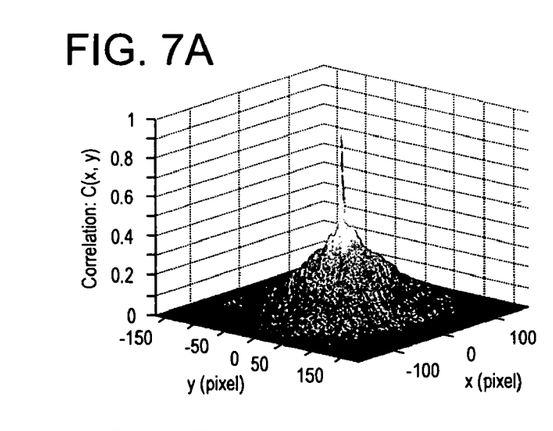
Figure 7B:
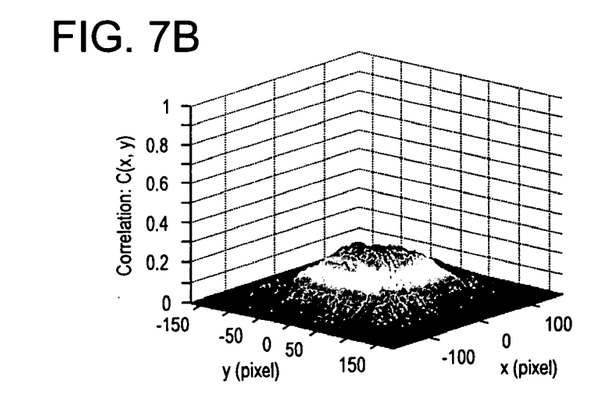
Figure 7C:
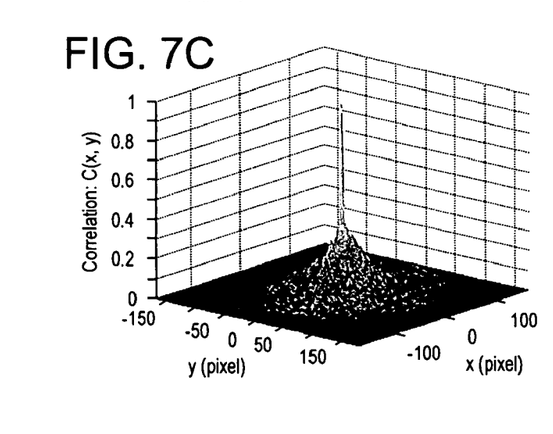
Figure 7D:
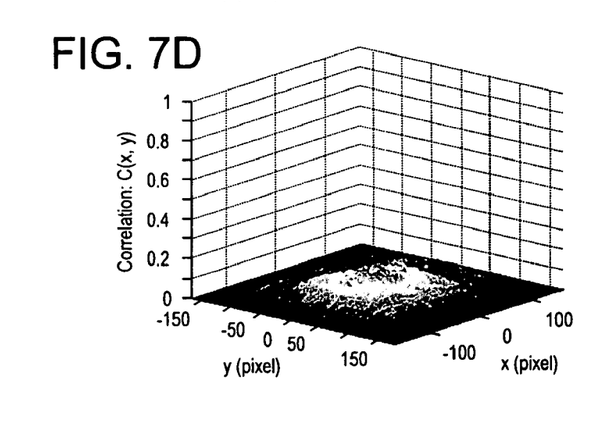

FIGS. 7(a)–(b) and (c)–(d) represent the normalized correlation obtained by use of single exposure on-axis digital holography and phase shifting on-axis digital holography, respectively. All plots are normalized by the correlation peak value obtained when the training image #3 is used as input scene. As can be seen in FIG. 4(a)–(c) and FIG. 6(a)–(c), for the single exposure on-axis digital holography, the reconstructed image quality degrades due to the presence of its conjugate image. The 3-D object recognition by use of single exposure on-axis digital holography, which employs both the phase and amplitude information, is capable of 3-D object recognition. However, the distortion-tolerant capability of the single exposure on-axis scheme somewhat degrades after the averaging and median filtering since the 3-D object information contained in the conjugate image term is disappeared due to the pre-processing. The degradation of the recognition capability could be from the existence of the conjugate term in the single exposure approach.

Figure 8:
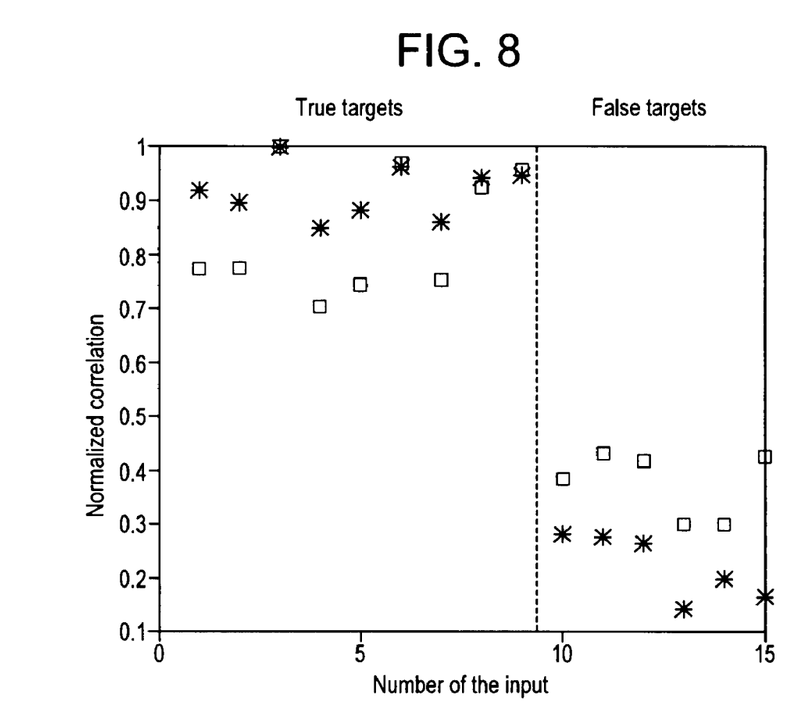
FIG. 8. shows a normalized correlation distribution for various input images of true targets (#1~#9) and false class objects (#10–#15) for single exposure on-axis digital holography (□) and on-axis phase shifting digital holography (*).

FIG. 8 illustrates the distortion tolerant 3-D recognition capability of the single exposure on-axis digital holographic approach. The degradation in recognition capability is not substantially less that that of on-axis phase shifting digital holography.

Longitudinal Shift Tolerance

We have examined the longitudinal shift tolerance of the single exposure scheme in order to compare with that of phase shifting digital holography. For the practical use of digital holography in distortion-tolerant recognition, it must also be less sensitive to longitudinal shifts along the z axis for recognizing a true class input target. It provides benefits in terms of the reduced number of reconstructions that must be performed for recognizing the input 3-D object. For this longitudinal shift tolerance, we construct another non-linear composite filter which includes a number of out-of focus reference reconstruction images. For constructing this filter, we use only one hologram (synthesized hologram: #3) among the three used for constructing the composite filter in rotational distortion tolerance. We use the same three reconstruction windows for generating training images. However, for each window, we also use three reconstructed images with a defocus of −20 and 20 mm as well as the reconstructed image of the reference object in the focus plane. Likewise, nine views are used to construct the new non-linear composite filter for longitudinal shift tolerance.

Figure 9:
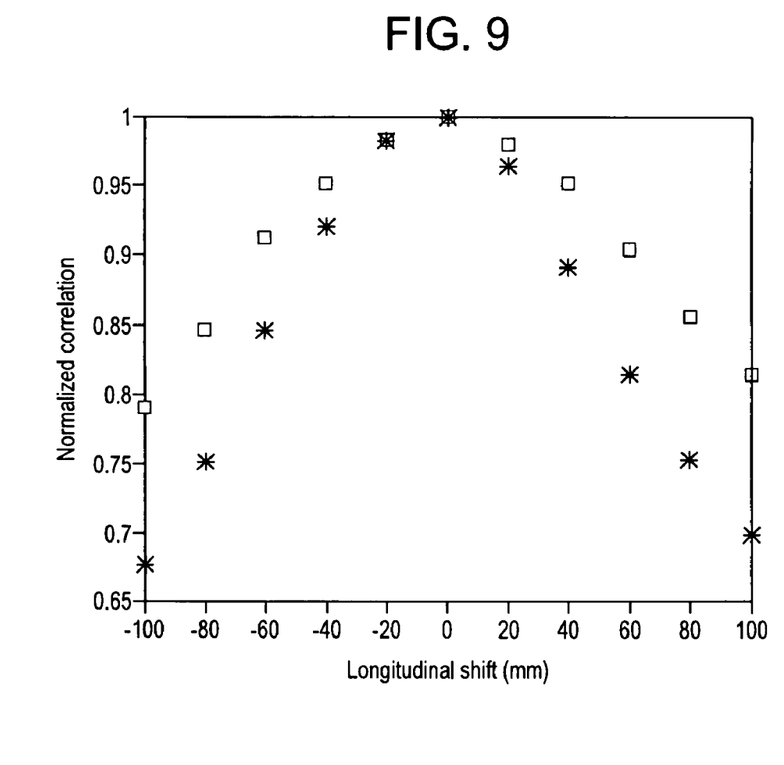
FIG. 9. shows normalized correlation peak values versus longitudinal shift along the z axis for single exposure on-axis digital holography (□) and on-axis phase shifting digital holography (*).

FIG. 9 represent the normalized correlation peak values versus longitudinal shift for both the single exposure on-axis scheme and the phase shifting digital holographic approach when a distorted reference target is in the input scene. It shows that the single exposure on-axis scheme is less sensitive to longitudinal shift than the on-axis phase shifting approach. The reason that the sensitivity is less for the single exposure scheme compared with that of the phase-shifting approach may be due to the inherent image degradation of the single exposure scheme as stated earlier. The single exposure on-axis approach seems to be somewhat more robust to the variation of longitudinal shift.

We have presented a distortion-tolerant 3-D object recognition system using single exposure on-axis digital holography. The proposed method requires only a single hologram recoding for the distortion-tolerant 3-D object recognition while the on-axis phase shifting based approach requires multiple recordings. The main benefit of the proposed single exposure method is that it can provide more robustness to environmental noise factors such as vibration since it uses only a single hologram, which can be measured and analyzed in real time. Experimental results show that the distortion-tolerant recognition capability of the single exposure approach is somewhat worse than that of the phase-shifting digital holographic method. Nevertheless, the proposed single exposure method makes the recording system simpler and more tolerant to object parameters such as moving targets while maintaining a distortion-tolerant 3-D object recognition capability.

One of ordinary skill in the art can appreciate that a computer or other client or server device can be deployed as part of a computer network, or in a distributed computing environment. In this regard, the methods and apparatus described above and/or claimed herein pertain to any computer system having any number of memory or storage units, and any number of applications and processes occurring across any number of storage units or volumes, which may be used in connection with the methods and apparatus described above and/or claimed herein. Thus, the same may apply to an environment with server computers and client computers deployed in a network environment or distributed computing environment, having remote or local storage. The methods and apparatus described above and/or claimed herein may also be applied to standalone computing devices, having programming language functionality, interpretation and execution capabilities for generating, receiving and transmitting information in connection with remote or local services.

The methods and apparatus described above and/or claimed herein is operational with numerous other general purpose or special purpose computing system environments or configurations. Examples of well known computing systems, environments, and/or configurations that may be suitable for use with the methods and apparatus described above and/or claimed herein include, but are not limited to, personal computers, server computers, hand-held or laptop devices, multiprocessor systems, microprocessor-based systems, network PCs, minicomputers, mainframe computers, distributed computing environments that include any of the above systems or devices.

The methods described above and/or claimed herein may be described in the general context of computer-executable instructions, such as program modules, being executed by a computer. Program modules typically include routines, programs, objects, components, data structures, etc. that perform particular tasks or implement particular abstract data types. Thus, the methods and apparatus described above and/or claimed herein may also be practiced in distributed computing environments such as between different units where tasks are performed by remote processing devices that are linked through a communications network or other data transmission medium. In a typical distributed computing environment, program modules and routines or data may be located in both local and remote computer storage media including memory storage devices. Distributed computing facilitates sharing of computer resources and services by direct exchange between computing devices and systems. These resources and services may include the exchange of information, cache storage, and disk storage for files. Distributed computing takes advantage of network connectivity, allowing clients to leverage their collective power to benefit the entire enterprise. In this regard, a variety of devices may have applications, objects or resources that may utilize the methods and apparatus described above and/or claimed herein.

Computer programs implementing the method described above will commonly be distributed to users on a distribution medium such as a CD-ROM. The program could be copied to a hard disk or a similar intermediate storage medium. When the programs are to be run, they will be loaded either from their distribution medium or their intermediate storage medium into the execution memory of the computer, thus configuring a computer to act in accordance with the methods and apparatus described above.

The term "computer-readable medium" encompasses all distribution and storage media, memory of a computer, and any other medium or device capable of storing for reading by a computer a computer program implementing the method described above.

Thus, the various techniques described herein may be implemented in connection with hardware or software or, where appropriate, with a combination of both. Thus, the methods and apparatus described above and/or claimed herein, or certain aspects or portions thereof, may take the form of program code or instructions embodied in tangible media, such as floppy diskettes, CD-ROMs, hard drives, or any other machine-readable storage medium, wherein, when the program code is loaded into and executed by a machine, such as a computer, the machine becomes an apparatus for practicing the methods and apparatus of described above and/or claimed herein. In the case of program code execution on programmable computers, the computing device will generally include a processor, a storage medium readable by the processor, which may include volatile and non-volatile memory and/or storage elements, at least one input device, and at least one output device. One or more programs that may utilize the techniques of the methods and apparatus described above and/or claimed herein, e.g., through the use of a data processing, may be implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of described above and/or claimed herein may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or a receiving machine having the signal processing capabilities as described in exemplary embodiments above becomes an apparatus for practicing the method described above and/or claimed herein. When implemented on a general-purpose processor, the program code combines with the processor to provide a unique apparatus that operates to invoke the functionality of the methods and apparatus of described above and/or claimed herein. Further, any storage techniques used in connection with the methods and apparatus described above and/or claimed herein may invariably be a combination of hardware and software.

The operations and methods described herein may be capable of or configured to be or otherwise adapted to be performed in or by the disclosed or described structures.

While the methods and apparatus described above and/or claimed herein have been described in connection with the preferred embodiments and the figures, it is to be understood that other similar embodiments may be used or modifications and additions may be made to the described embodiment for performing the same function of the methods and apparatus described above and/or claimed herein without deviating therefrom. Furthermore, it should be emphasized that a variety of computer platforms, including handheld device operating systems and other application specific operating systems are contemplated, especially given the number of wireless networked devices in use.

While the description above refers to particular embodiments, it will be understood that many modifications may be made without departing from the spirit thereof. The accompanying claims are intended to cover such modifications as would fall within the true scope and spirit of the present invention.

What is claimed is:

1. A method for a distortion-tolerant 3-D object recognition comprising:

recording a single exposure digital hologram of a 3D object on a sensor by on-axis digital holography;

representing the recorded single exposure digital hologram mathematically as a synthesized hologram comprising object and reference wave functions;

numerically reconstructing 3D multi-perspective sectional images of the 3D object at different distances and different angles of view from the sensor from the synthesized hologram as a reconstructed complex wave function of the 3D object;

repeating the steps above for at least one comparison 3D object and obtaining a comparison reconstructed complex wave function of the comparison 3D object;

constructing a correlation filter for 3D distortion-tolerant object recognition from the reconstructed complex wave function of the 3D object and from the at least one comparison reconstructed complex wave function of the comparison 3D object also recorded; and correlating the reconstructed complex wave function of the 3D object to the comparison reconstructed complex wave function of the comparison 3D object using the correlation filter in order to recognize 3D objects.

2. The method of claim 1 wherein the representing the recorded single exposure digital hologram mathematically as the synthesized hologram comprising object and reference wave functions is performed according to the following:

$$u_i^s(x, y) = O(x, y)R^*(x, y) + O^*(x, y)R(x, y)$$

$$= H(x, y, 0) - |R(x, y)|^2 -$$

$$\frac{1}{N^2}\sum_{k=0}^{N-1}\sum_{l=0}^{N-1}\{H(k\Delta x, l\Delta y, 0) - |R(k\Delta x, l\Delta y)|^2\}$$

where, H(x,y,0) represents a hologram recorded on a CCD sensor for zero phase shift, [O(x,y)] and [R(x,y)] represent Fresnel diffraction of the 3-D object and the reference wave functions, respectively, N is a windowed hologram size used for image reconstruction and $\Delta x$ and $\Delta y$ represent the directional spatial resolution of the sensor, k and l are integers that vary from 0 to N−1, the reference wave $|R(x,y)|^2$ can be assumed to be a known function because it is not changed while the object intensity distribution varies according to the input scene, the DC term $|O(x,y)|^2$ generated by the object can be reduced effectively by employing an averaging over the whole hologram as described in the third term, and thus, the index $u_i^s(x,y)$ can be regarded as a synthesized result obtained by use of only a single hologram.

3. The method of claim 2 wherein the reconstructed complex wave function of the 3D object is reconstructed by using the following inverse Fresnel transformation:

$$u_o(x', y') = \frac{\exp(ikd)}{id\lambda}\exp\left[\frac{ik}{2d}(x'^2 + y'^2)\right] \times F\left\{u_i(x, y)\exp\left[\frac{ik}{2d}(x^2 + y^2)\right]\right\}$$

where, $u_o(x',y')$ is the reconstructed complex optical field at a parallel plane which is at a distance d from a CCD sensor, F denotes the 2-D Fourier transformation, $u_i(x,y)$ represents the input synthesized hologram which can be $u_i^S(x,y)$ for a single exposure scheme, and $\lambda$ and k denote the used laser wavelength and its wavenumber defined by $2\pi/\lambda$, respectively.

4. The method of claim 1 wherein the recording a single exposure digital hologram is taken of at least one moving 3D object.

5. The method of claim 1 wherein the recording a single exposure digital hologram is taken of a 3D object that is subject to vibration.

6. The method of claim 1 wherein the recording a single exposure digital hologram is taken of a 3D object that is subject to environmental noise.

7. The method of claim 1 wherein the correlating is performed in real time.

8. The method of claim 1 wherein the correlating is performed by removing phase terms from at least one of the reconstructed complex wave functions.

9. The method of claim 1 wherein the correlating is performed by preprocessing the reconstructed complex wave functions using averaging and median filtering techniques.

10. A sensor system for a distortion-tolerant 3-D object recognition comprising:
 a sensor for recording a single exposure digital hologram of a 3D object by on-axis digital holography;
 a processor for representing the recorded single exposure digital hologram mathematically as a synthesized hologram comprising object and reference wave functions and numerically reconstructing 3D multi-perspective sectional images of the 3D object at different distances and different angles of view from the sensor from the synthesized hologram as a reconstructed complex wave function of the 3D object and for repeating the steps above for at least one comparison 3D object and obtaining a comparison reconstructed complex wave function of the comparison 3D object; and
 a correlation filter for 3D distortion-tolerant object recognition from the reconstructed complex wave function of the 3D object and from the at least one comparison reconstructed complex wave function of the comparison 3D object also recorded and correlating the reconstructed complex wave function of the 3D object to the comparison reconstructed complex wave function of the comparison 3D object using the correlation filter in order to recognize 3D objects.

11. The sensor system of claim 10 wherein the processor for representing the recorded single exposure digital hologram mathematically as the synthesized hologram comprising object and reference wave functions is structured to perform the representing according to the following:

$$u_i^s(x, y) = O(x, y)R^*(x, y) + O^*(x, y)R(x, y)$$
$$= H(x, y, 0) - |R(x, y)|^2 -$$
$$\frac{1}{N^2}\sum_{k=0}^{N-1}\sum_{l=0}^{N-1}\{H(k\Delta x, l\Delta y, 0) - |R(k\Delta x, l\Delta y)|^2\}$$

where, H(x,y,0) represents a hologram recorded on a CCD sensor for zero phase shift, [O(x,y)] and [R(x,y)] represent Fresnel diffraction of the 3-D object and the reference wave functions, respectively N is a windowed hologram size used for image reconstruction and $\Delta x$ and $\Delta y$ represent the directional spatial resolution of the sensor, k and l are integers that vary from 0 to N−1, the reference wave $|R(x,y)|^2$ can be assumed to be a known function because it is not changed while the object intensity distribution varies according to the input scene, the DC term $|O(x,y)|^2$ generated by the object can be reduced effectively by employing an averaging over the whole hologram as described in the third term, and thus, the index $u_i^S(x,y)$ can be regarded as a synthesized result obtained by use of only a single hologram.

12. The sensor system of claim 11 wherein the reconstructed complex wave function of the 3D object is reconstructed by using the following inverse Fresnel transformation:

$$u_o(x', y') = \frac{\exp(ikd)}{id\lambda}\exp\left[\frac{ik}{2d}(x'^2 + y'^2)\right] \times F\left\{u_i(x, y)\exp\left[\frac{ik}{2d}(x^2 + y^2)\right]\right\}$$

where, $u_o(x',y')$ is the reconstructed complex optical field at a parallel plane which is at a distance d from a CCD sensor, F denotes the 2-D Fourier transformation, $u_i(x,y)$ represents the input synthesized hologram which can be $u_i^S(x,y)$ for a single exposure scheme, and $\lambda$ and k denote the used laser wavelength and its wavenumber defined by $2\pi/\lambda$, respectively.

13. The sensor system of claim 10 wherein the recording a single exposure digital hologram is taken of at least one moving 3D object.

14. The sensor system of claim 10 wherein the recording a single exposure digital hologram is taken of a 3D object that is subject to vibration.

15. The sensor system of claim 10 wherein the recording a single exposure digital hologram is taken of a 3D object that is subject to environmental noise.

16. The sensor system of claim 10 wherein the correlating is performed in real time.

17. The sensor system of claim 10 wherein the correlating is performed by removing phase terms from at least one of the reconstructed complex wave functions.

18. The sensor system of claim 10 wherein the correlating is performed by preprocessing the reconstructed complex wave functions using averaging and median filtering techniques.

19. A computer readable medium having computer readable instructions stored thereon for execution by a processor to perform a method for a distortion-tolerant 3-D object recognition comprising:
  recording a single exposure digital hologram of a 3D object on a sensor by on-axis digital holography;
  representing the recorded single exposure digital hologram mathematically as a synthesized hologram comprising object and reference wave functions;
  numerically reconstructing 3D multi-perspective sectional images of the 3D object at different distances and different angles of view from the sensor from the synthesized hologram as a reconstructed complex wave function of the 3D object;
  repeating the steps above for at least one comparison 3D object and obtaining a comparison reconstructed complex wave function of the comparison 3D object;
  constructing a correlation filter for 3D distortion-tolerant object recognition from the reconstructed complex wave function of the 3D object and from the at least one comparison reconstructed complex wave function of the comparison 3D object also recorded; and
  correlating the reconstructed complex wave function of the 3D object to the comparison reconstructed complex wave function of the comparison 3D object using the correlation filter in order to recognize 3D objects.

20. The computer readable medium of claim 19 wherein the representing the recorded single exposure digital hologram mathematically as the synthesized hologram comprising object and reference wave functions is performed according to the following:

$$u_i^S(x, y) = O(x, y)R^*(x, y) + O^*(x, y)R(x, y)$$
$$= H(x, y, 0) - |R(x, y)|^2 -$$
$$\frac{1}{N^2}\sum_{k=0}^{N-1}\sum_{l=0}^{N-1}\{H(k\Delta x, l\Delta y, 0) - |R(k\Delta x, l\Delta y)|^2\}$$

where, $H(x,y,0)$ represents a hologram recorded on a CCD sensor for zero phase shift, $[O(x,y)]$ and $[R(x,y)]$ represent Fresnel diffraction of the 3-D object and the reference wave functions, respectively, N is a windowed hologram size used for image reconstruction and $\Delta x$ and $\Delta y$ represent the directional spatial resolution of the sensor, k and l are integers that vary from 0 to N−1, the reference wave $|R(x,y)|^2$ can be assumed to be a known function because it is not changed while the object intensity distribution varies according to the input scene, the DC term $|O(x,y)|^2$ generated by the object can be reduced effectively by employing an averaging over the whole hologram as described in the third term, and thus, the index $u_i^S(x,y)$ can be regarded as a synthesized result obtained by use of only a single hologram.

* * * * *